United States Patent
Craig et al.

(10) Patent No.: US 6,433,077 B1
(45) Date of Patent: Aug. 13, 2002

(54) EMULSION POLYMERIZED SILICONE RUBBER-BASED IMPACT MODIFIERS, METHOD OF MAKING, AND BLENDS THEREOF

(75) Inventors: Daniel Horace Craig, Niskayuna; Rong Hu, Latham, both of NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/660,964

(22) Filed: Sep. 13, 2000

Related U.S. Application Data

(62) Division of application No. 09/207,073, filed on Dec. 7, 1998, now abandoned.

(51) Int. Cl.$^7$ .............................................. C08G 77/08
(52) U.S. Cl. .......................... 524/837; 528/23; 528/30; 528/37
(58) Field of Search .......................... 524/837; 538/30, 538/37, 23

(56) References Cited

U.S. PATENT DOCUMENTS

| | | | |
|---|---|---|---|
| 3,433,780 A | * | 3/1969 | Cekada et al. |
| 4,935,464 A | * | 6/1990 | Ona et al. .................... 524/837 |
| 4,935,484 A | * | 6/1990 | Wolfgruber et al. .......... 528/34 |
| 5,726,270 A | * | 3/1998 | Craig .......................... 528/23 |
| 5,817,714 A | * | 10/1998 | Graiver et al. ............... 524/762 |
| 5,900,460 A | * | 5/1999 | Craig .......................... 524/837 |
| 6,169,149 B1 | * | 1/2001 | Craig et al. .................. 524/474 |
| 6,214,927 B1 | * | 4/2001 | Craig et al. .................. 524/837 |

* cited by examiner

Primary Examiner—Margaret G. Moore
(74) Attorney, Agent, or Firm—Bernadette M. Bennett; Noreen C. Johnson

(57) ABSTRACT

A method is provided for making emulsion polymerized silicone rubber having an average particle size of from about 400 nm to 2 microns and grafts thereof. Thermoplastic blends having improved weatherability and impact strength are also provided based on the use of a thermoplastic organic polymer and a graft of such emulsion polymerized silicone rubber as an impact modifier.

9 Claims, No Drawings

EMULSION POLYMERIZED SILICONE RUBBER-BASED IMPACT MODIFIERS, METHOD OF MAKING, AND BLENDS THEREOF

CROSS-REFERENCE TO RELATED APPLICATIONS

This application is a divisional of application Ser. No. 09/207,073, filed Dec. 7, 1998, now abandoned, which is hereby incorporated by reference in its entirety.

BACKGROUND OF THE INVENTION

The present invention relates to silicone rubber-based impact modifiers in the form of polymerized alkenyl monomer-containing grafts, such as styrene and acrylonitrile, of emulsion polymerized silicone rubber particles having an average particle size in the range of about 400 nm or more. More particularly, the present invention relates to the employment of such polymerized alkenyl containing impact modifiers in thermoplastic resins to provide thermoplastic compositions having enhanced impact strength and improved weatherability.

As shown by Craig, U.S. Pat. No. 5,726,270, which is incorporated herein by reference, aqueous dispersions of organopolysiloxanes are provided in the form of monomodal organopolysiloxane particles having a pre-determined particle size of up to about 2 microns. As discussed in U.S. Pat. No. 5,726,270, current. manufacturing practices for making organopolysiloxane dispersions often emulsify pre-existing organopolysiloxane fluids or gums under high shear conditions. Alternative procedures include batch stirring siloxane precursors in water in the presence of a surfactant. Additional emulsion polymerization methods are taught, such as shown in U.S. Pat. No. 2,891,920, which describes the use of a base catalyst with a cationic surfactant, and J.P.62141029 A2 870624, which is directed to a continuous addition of a pre-emulsion cyclo-siloxane precursor.

While various procedures are available for making aqueous polysiloxane emulsions having average particle sizes of about 10 to 300 nm, these dispersions often have been restricted to such applications as personal care, adhesives and coatings where small particles sizes often provide advantages.

It would be desirable therefor to be able to make aqueous dispersions of emulsion polymerized silicone rubber particles to expand the utility of aqueous polysiloxane emulsions to silicone emulsion rubbers having an average particle size of about 400 nm, or greater.

It also would be desirable to provide low temperature impact modifiers in the form of polymerized alkenyl monomer-containing grafts of such emulsion polymerized silicone rubber particles.

In addition, it would be desirable to provide thermoplastic compositions comprising a thermoplastic polymer and an effective amount of an impact modifier in the form of a polymerized alkenyl monomer-containing graft of an emulsion polymerized silicone rubber having an average particle size of 400 nm, or greater.

BRIEF SUMMARY OF THE INVENTION

The present invention is based on the discovery that silicone rubber particles having a volume average particle size of 400 nm or greater can be made by a single stage semi-continuous process involving the emulsion polymerization of siloxane precursors under low shear, substantially non-homogenizing conditions.

As used hereinafter, the expression "semi-continuous process" means the introduction under emulsion polymerization conditions of silicone rubber siloxane precursors, such as octamethylcyclotetrasiloxane and γ-mercaptopropyltrimethoxysilane into a reactor over an extended period of time, for example, about 2 to about 12 hours, and preferably, about 4 to about 8 hours.

The expression semi-continuous process also includes the employment of mild, and/or low shear non-homogenizing conditions during the emulsion polymerization of the silicone rubber siloxane precursors. The degree of agitation used during the semi-continuous processing of the silicone rubber siloxane precursors substantially minimizes the formation of silicone rubber particles having an average particle size of below about 400 nm.

The resulting silicone rubber particles can thereafter be respectively grafted with a polymerizable alkenyl monomer, such as a vinyl monomer, to form a polymerized alkenyl polymer shell, to provide valuable impact modifiers for a variety of thermoplastic polymers, such as polyesters, polycarbonates, polyestercarbonates, polyimides, polyetherimides, and polyamides.

STATEMENT OF THE INVENTION

There is provided by the present invention, a method for making an aqueous silicone rubber latex, which comprises, (1) semi-continuously adding silicone rubber siloxane precursors into a reactor to provide contact under agitation with a reaction mixture comprising water and an acid catalyst-surfactant at a temperature in the range of about 30° C. to about 110° C., and (2) recovering a silicone rubber latex comprising silicone rubber particles having a volume average particle size in the range of about 400 nm to about 2 microns.

There is also provided, a method for making a silicone rubber-based graft copolymer comprising, (1) effecting reaction at a temperature of about 50° C. to about 95° C. between (A) an aqueous silicone rubber latex having a pH of about 3 to about 9, and comprising silicone rubber particles having a volume average particle size in the range of about 400 nm to about 2 microns, and (B) an aqueous mixture comprising at least one polymerizable alkenyl organic monomer, where a sufficient proportion of mixture (B) is utilized in the reaction to provide from about 15% to about 75% by weight of alkenyl polymer shell, based on the total weight of graft copolymer, and (2) coagulating the resulting latex from (1), and (3) recovering, washing, and thereafter drying the resulting solids.

There is further provided, a method for making a silicone rubber-based graft copolymer comprising, (1) effecting reaction at a temperature of about 50° C. to about 95° C. between (A) an aqueous silicone rubber latex having a pH of about 3 to about 9, and comprising silicone rubber particles having a volume average particle size in the range of about 400 nm to about 2 microns, and (B) an aqueous mixture comprising, styrene and acrylonitrile in a weight ratio of between about 90:10 to about 50:50, where a sufficient proportion of mixture (B) is utilized in the reaction, to provide from about 15% to about 75% by weight of alkenyl polymer shell, based on the total weight of graft copolymer, and (2) coagulating the resulting latex from (1), and (3) recovering, washing, and thereafter drying the resulting solids.

There is still further provided by the present invention, a thermoplastic blend comprising (C), thermoplastic polymer, and (D) about 5% to about 50% by weight, based on the weight of thermoplastic blend, of a silicone rubber graft copolymer having about 15% to about 75% by weight of alkenyl polymer shell, and silicone rubber particles having a volume average particle size in the range of about 400 nm to about 2 microns.

Still another aspect of the present invention is directed to a method for preparing a thermoplastic blend, which comprises mixing (C), thermoplastic polymer, and (D) about 5% to about 50% by weight, based on the weight of thermoplastic blend, of a silicone rubber graft copolymer having about 15% to about 75% by weight of alkenyl polymer shell, and silicone rubber particles having a volume average particle size in the range of about 400 nm to about 2 microns.

DETAILED DESCRIPTION OF THE INVENTION

In the practice of one form of the method of the invention, an emulsion polymerized silicone rubber latex is initially formed by semi-continuously adding to a reactor containing water, which is being agitated, such as by stirring, at a temperature in the range of about 30° C. to about 110° C., and preferably about 75° C. to about 95° C., a mixture of silicone rubber monomers. The semi-continuous addition of monomers can be effected, stepwise, and in a dropwise manner, over a period of up to about 24 hours. An effective amount of a surfactant can be used initially in the reactor as part of the agitated aqueous mixture, or it can be introduced with the silicone rubber monomers.

Among the surfactants which can be used, dodecylbenzenesulfonic acid is preferred. Surfactants which can be used in the practice of the invention include acid catalyst-surfactants, for example, sulfonic acids, such as alkyl-, and alkaryl-arylsulfonic acids and mixtures of surface-active sulfonic acid salts with strong mineral acids. Additional sulfonic acid catalysts/surfactants are shown in U.S. Pat. No. 3,294,725, and Craig, U.S. Pat. No. 5,726,270 which are incorporated herein by reference.

Various silicone rubber monomers can be used to form the initial emulsion polymerized silicone rubber latex used in the practice of the invention. Some of the preferred silicone rubber monomers include cyclosiloxanes, such as octamethylcyclotetrasiloxane, as shown for example in the Encyclopedia of Polymer Science and Engineering, Volume 15, 2nd Edition, pp. 205–308, (1989), John Wiley and Sons. Cross-linking silanes include trifunctional such as trimethoxymethylsilane, and triethoxyphenylsilane, and tetrafunctional, for example, tetraethoxysilane. The cross-linking silanes can be used at from about 0.1% to 30% by weight of the silicone rubber monomer mixture. Useful emulsion polymerizable silicone rubber monomers are for example cycloalkylsiloxanes, such as hexamethylcyclotrisiloxane, or octamethylcyclotetrasiloxane which can be copolymerized with from about 0.1% to about 30% by weight of a cross-linking agent. Suitable cross-linking agents are for example, tetraalkoxysilane, such as, tetraethoxysilane, and in further combination with an alkylacryloxyalkyldialkoxyalkylsilane, as illustrated by γ-methacryloxypropyldimethoxymethylsilane. A comprehensive list of silicone rubber monomers can be found in "Silicones", Hardman and Torkelson, Encyclopedia of Polymer Science and Engineering, volume 15, 2nd Edition, pp. 205–308, (1989), John Wiley and Sons, which is incorporated herein by reference.

In preparing the graft of the emulsion polymerized silicone rubber latex, a suitable polymerizable alkenyl monomer, alone, or in combination as a mixture of two or more alkenyl monomers, such as styrene, triallyl cyanurate, acrylonitrile, and methylmethacrylate, can be used in combination with the rubber latex. When a mixture of styrene and acrylonitrile is used, then their weight ratio is between about 90:10 to about 50:50.

The proportion of alkenyl monomer and emulsion polymerized rubber latex can vary widely by weight. For example, there can be used by weight, from about 15% to about 75% alkenyl monomer, based on the total weight of graft copolymer.

In order that those skilled in the art will be better able to practice the invention, the following examples are given by way of illustration, and not by way of limitation. All parts are by weight unless otherwise indicated.

Weight percent solids of latex samples are determined after drying to a constant weight with a CEM Labwave 9000 gravimetric microwave drier. Particle size distributions are obtained using a Nicomp 370 Submicron Particle Sizer instrument applying a Gaussian analysis protocol.

EXAMPLE 1

There are concurrently added dropwise over a seven hour period, two feed streams into a 2000 ml reactor containing 450 g of water, which is being agitated continuously and is at a temperature of 86° C. One of the feed streams is a solution of 9.35 g of dodecylbenzenesulfonic acid in 300 g of water; the second feed stream is 931 g of octamethylcyclotetrasiloxane. The resulting reaction mixture is heated and agitated for an additional 7 hours. It is then cooled to room temperature.

There is added batch-wise to the above reaction mixture at room temperature, 28.3 g of γ-mercaptopropyltrimethoxysilane, and the resulting mixture is reheated to 86° C., and maintained at 86° C. for 12 hours. The reaction mixture is allowed to cool to room temperature and characterized. There is obtained a silicone rubber latex having 51.5% by weight solids and a volume average particle size of 700 nm.

A styrene and acrylonitrile mixture is pumped over a two hour period into a 5 liter glass reactor which contains an agitated mixture at 80° C. of 1751 g of distilled water, and 1693 g of the above silicone rubber latex which has been neutralized to a pH of 6.5 with 4 g sodium bicarbonate dissolved in 50 ml water. The styrene and acrylonitrile mixture consists of 573 g of styrene, 286 g of acrylonitrile, 1.3 g of a 75% sodium dioctylsulfosuccinate in 50/50 ethanol/water mixture, and 2.6 g t-amylperoxyoctoate. The resulting reaction mixture is heated at 85° C. for an additional two hours. The mixture is then allowed to cool to room temperature. There is obtained a silicone rubber graft copolymer latex. The silicone rubber graft copolymer latex has 40.4% total solids by weight, and the volume average particle size is 741 nm.

The above graft copolymer latex is coagulated in a 1.5% aqueous calcium chloride solution maintained at 85° C., via slow addition of 1 part of the latex to two parts of calcium chloride solution. The resulting polymer solids are filtered, washed with distilled water at ambient temperatures, and dried in a vacuum oven at room temperature for 24 hours, then at 70° C. for at least 24 hours. There is obtained a fine powder.

The above procedure is repeated to form comparative silicone-based graft copolymers from comparative silicone rubber latexes. While substantially the same siloxane monomers are used to make the comparative silicone rubber latexes, these comparative silicone rubber latexes are not made in a semi-continuous manner in accordance with the practice of the invention.

For example, instead of introducing the siloxane reactants dropwise in a semi-continuous manner, the siloxane reactants are initially mixed under high shear conditions for 5 minutes at 8000 rpm. The mixture is then passed twice through a homogenizer for 2 passes under a pressure of 7000 psi to form a stable pre- emulsion. After stirring for 6 hours at 80° C., it is allowed to cool to room temperature to provide a silicone rubber latex having an average particle size of 240 nm. This silicone rubber latex is grafted with a styrene and acrylonitrile following substantially the same procedure as shown above. The resulting silicone rubber graft copolymer latex has 37% of total solids by weight.

An additional silicone rubber latex is prepared by constantly agitating a mixture of siloxane precursors for three hours at 89° C., followed by adding dropwise to the resulting mixture over three hours, a pre-emulsion of additional silicone rubber siloxane precursors. After post reacting for three hours, there is formed a silicone rubber latex having an average particle size of 170 nm. The resulting silicone rubber graft copolymer latex has 35% of total solids by weight.

EXAMPLE 2

Dry blends are prepared from the respective silicone-based graft copolymers based on respective silicone rubber latexes having an average particle size of 170 nm, 240 nm and 700 nm. There are used 54 parts of the silicone-based graft copolymer, 46 parts of a 75:25 by weight of a styrene-acrylonitrile copolymer, and 1 part Irganox 1076 stabilizer. The respective dry blends are mixed and extruded to obtain pellets using a Welding Engineers 20 mm twin-screw extruder at 450° F. set temperature, 400 rpm, and 15–17 lbs/hour throughput. The pellets are injected molded into test specimens using an Engel 30 ton injection molder with 450° F. barrel set temperature and 145° F. mold temperature.

Izod impact values are averages of six samples, specimen width 0.125 in, 2 lb pendulum capacity, obtained using a Testing Machines Inc. Monitor/Impact instrument model #43-02 at room temperature.

The Izod impact data generated by the thermoplastic materials are shown in the following Table where SAN means styrene-acrylonitrile copolymer:

| Graft Copolymer/SAN (parts by weight) | Silicone Rubber Particle Size (nm) | RT Izod Impact (ft-lb/in) |
|---|---|---|
| 54/46 | 240 | 1.0 |
| 54/46 | 170 | 1.0 |
| 54/46 | 700 | 3.5 |

The above results show that silicone latex made in accordance with the method of the present invention can provide impact modifiers which can be used to make thermoplastic blends having enhanced impact strength and weatherability.

The impact modifiers of the present invention also can be used to impart improved impact strength and weatherability to other thermoplastic blends including those comprising at least one polyester, polycarbonate, polyestercarbonate, polyamide, polyimide, polyetherimide, polyphenylene ether, polystyrene, or a copolymer of styrene with acrylonitrile, methacrylonitrile, esters of acrylic acid, methacrylic acid or copolymers thereof. Such impact modified blends are used in many applications requiring good weatherability and low temperature impact strength, including automotive, building, and construction applications, and in articles of manufacture such as garden furniture, boats, signs, outdoor enclosures for electrical or telecommunications interface devices such as smart network interface devices (SNID), and the like.

What is claimed is:

1. A method for making an aqueous silicone rubber latex, which comprises,
   (1) semi-continuously adding non-emulsified silicone rubber siloxane precursors concurrently with a reaction mixture into a reactor to provide contact under agitation wherein the reaction mixture comprises water and an acid catalyst-surfactant at a temperature in the range of about 30° C. to about 110° C., and
   (2) recovering a silicone rubber latex comprising silicone rubber particles having a volume average particle size in the range of about 400 nm to about 2 microns.

2. A method in accordance with claim 1, where the siloxane precursors are added to the reactor over a period of several hours.

3. A method in accordance with claim 1, where the siloxane precursor is a mixture of octamethylcyclotetrasiloxane and gamma-mercaptopropyltrimethoxysilane.

4. A method in accordance with claim 1, where the acid-catalyst surfactant is dodecylbenzenesulfonic acid.

5. A method for making an aqueous silicone rubber latex, which comprises,
   (1) semi-continuously adding non-emulsified silicone rubber siloxane precursors into a reactor to provide contact under agitation with a reaction mixture comprising water and an acid catalyst-surfactant at a temperature in the range of about 30° C. to about 110° C. wherein the siloxans precursor is a mixture of octamethylcyclotetrasiloxane and gamma-mercaptopropyltrimethoxysilane, and
   (2) recovering a silicone rubber latex comprising silicone rubber particles having a volume average particle size in the range of about 400 nm to about 2 microns.

6. The method in accordance with claim 5, where the octamethylcyclotetrasiloxane and gamma-mercaptopropyltrimethoxysilane are added concurrently into the reactor with water and acid catalyst-surfactant.

7. The method in accordance with claim 5, where the octamethylcyclotetrasiloxane and gamma-mercaptopropyltrimethoxysilane are added to the reactor over a period of several hours.

8. The method in accordance with claim 5, where the acid-catalyst surfactant is dodecylbenzenesulfonic acid.

9. A method for making an aqueous silicone rubber latex, which comprises,
   (1) semi-continuously adding non-emulsified silicone rubber siloxane precursors concurrently with a reaction mixture into a reactor to provide contact under agitation wherein the reaction mixture comprises water and dodecylbenzenesulfonic acid at a temperature in the range of about 30° C. to about 110° C. wherein the siloxane precursor is a mixture of octamethylcyclotetrasiloxane and gamma-mercaptopropyltrimethoxysilane, and
   (2) recovering a silicone rubber latex comprising silicone rubber particles having a volume average particle size in the range of about 400 nm to about 2 microns.

* * * * *